United States Patent
Bortnik et al.

(10) Patent No.: US 10,786,770 B2
(45) Date of Patent: *Sep. 29, 2020

(54) COALESCING FILTER ELEMENT AND FILTER ASSEMBLY THEREFORE

(71) Applicant: Schroeder Industries, LLC, Leetsdale, PA (US)

(72) Inventors: Chris Bortnik, Warrendale, PA (US); Scott Surdick, Pittsburgh, PA (US); Michael J Schmitt, Pittsburgh, PA (US); Steven R Evanovich, Pittsburgh, PA (US); Andreas Schunk, Waldmohr (DE)

(73) Assignee: Schroeder Industries, LLC, Leetsdale, PA (US)

( * ) Notice: Subject to any disclaimer, the term of this patent is extended or adjusted under 35 U.S.C. 154(b) by 352 days.

This patent is subject to a terminal disclaimer.

(21) Appl. No.: 15/664,335

(22) Filed: Jul. 31, 2017

(65) Prior Publication Data

US 2017/0326484 A1    Nov. 16, 2017

Related U.S. Application Data

(63) Continuation of application No. 14/206,549, filed on Jul. 31, 2017, now Pat. No. 9,718,011.

(60) Provisional application No. 61/778,340, filed on Mar. 12, 2013.

(51) Int. Cl.
*B01D 27/06* (2006.01)
*B01D 29/23* (2006.01)
(Continued)

(52) U.S. Cl.
CPC ....... *B01D 36/003* (2013.01); *B01D 17/0208* (2013.01); *B01D 27/06* (2013.01);
(Continued)

(58) Field of Classification Search
CPC .... B01D 36/003; B01D 27/06; B01D 29/232; B01D 29/21; B01D 17/045;
(Continued)

(56) References Cited

U.S. PATENT DOCUMENTS 3,144,407 A * 8/1964 Olmos ................. B01D 17/045
                                                    210/307
3,223,240 A * 12/1965 Muller ................. B01D 17/045
                                                    210/96.1

(Continued)

FOREIGN PATENT DOCUMENTS

WO         1998/14257        4/1998

*Primary Examiner* — Lucas A Stelling
*Assistant Examiner* — Angel Olivera
(74) *Attorney, Agent, or Firm* — Blynn L. Shideler; Krisanne Shideler; BLK Law Group

(57) ABSTRACT

A coalescing filter element provides an integrated filter element with a three stage design with a hydrophobic or hydrophilic coalescing layer. A coalescing filter element comprises: a) At least one particulate filtration layer; b) A coalescing layer promoting coalescing of water particles, wherein the coalescing layer is downstream of the at least one particulate filtration layer relative to the flow of fluid through the element; c) An annular coalescing space downstream of the coalescing layer; d) A sump in a lower portion of the filter element in fluid communication with the annular coalescing space; and e) A hydrophobic layer downstream of the annular coalescing space, wherein fluid being cleaned by the element flows through the hydrophobic layer. The coalescing layer may be a hydrophobic or a hydrophilic coalescing layer. A filter assembly will include the coalescing filter element of the present invention.

14 Claims, 4 Drawing Sheets

(51) Int. Cl.
   *B01D 29/21* (2006.01)
   *B01D 17/02* (2006.01)
   *C10G 33/06* (2006.01)
   *B01D 17/04* (2006.01)
   *F02M 37/24* (2019.01)
   *B01D 36/00* (2006.01)

(52) U.S. Cl.
   CPC ............ *B01D 29/21* (2013.01); *B01D 29/232* (2013.01); *B01D 17/0214* (2013.01); *B01D 17/04* (2013.01); *B01D 17/045* (2013.01); *B01D 2201/188* (2013.01); *C10G 33/06* (2013.01); *F02M 37/24* (2019.01); *Y10S 210/05* (2013.01)

(58) Field of Classification Search
   CPC .......... B01D 17/0214; B01D 2201/188; F02M 37/24; Y10S 210/05; C10G 33/06
   See application file for complete search history.

(56) References Cited

U.S. PATENT DOCUMENTS

| | | | |
|---|---|---|---|
| 4,081,373 A * | 3/1978 | Rozniecki | B01D 17/0217 |
| | | | 210/114 |
| 4,292,179 A * | 9/1981 | Stone | B01D 17/045 |
| | | | 210/443 |
| 4,320,005 A * | 3/1982 | DeGraffenreid | B01D 29/232 |
| | | | 210/232 |
| 4,477,345 A * | 10/1984 | Szlaga, Jr. | B01D 17/0214 |
| | | | 210/130 |
| 6,328,883 B1 | 12/2001 | Jensen | |
| 8,034,240 B2 | 10/2011 | Reiland | |
| 9,546,626 B2 | 1/2017 | LaForge | |
| 9,604,167 B2 | 3/2017 | Popoff et al. | |
| 2011/0168647 A1* | 7/2011 | Wieczorek | B01D 29/21 |
| | | | 210/799 |
| 2014/0311963 A1 | 10/2014 | Bortnik et al. | |

* cited by examiner

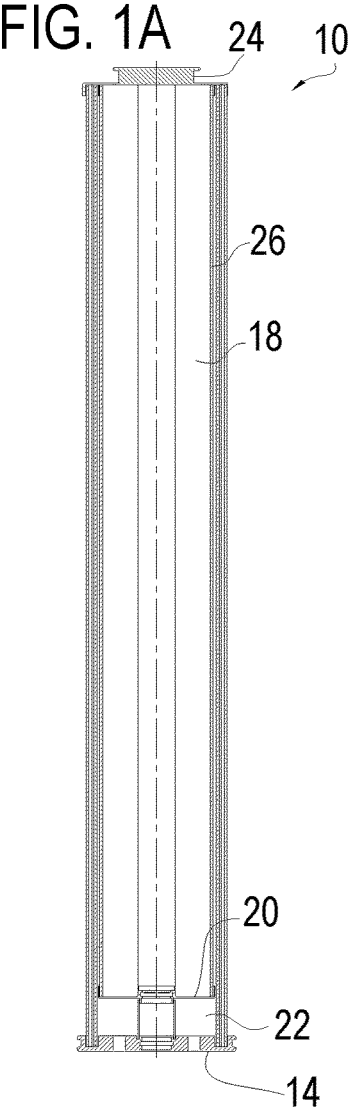
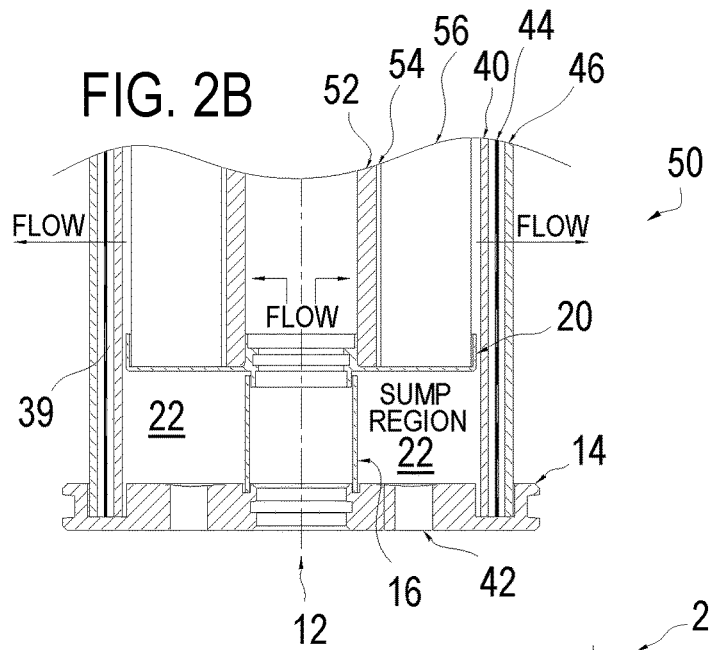
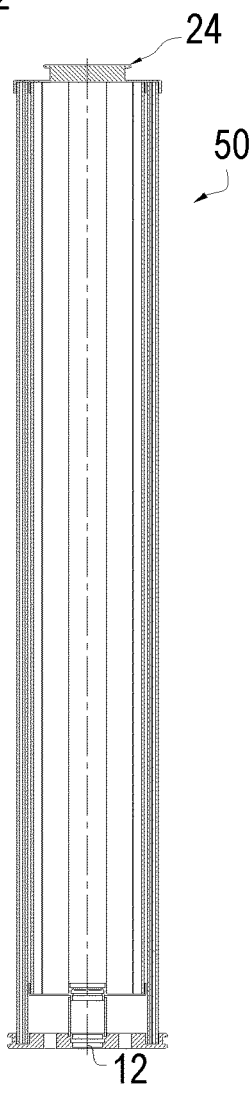
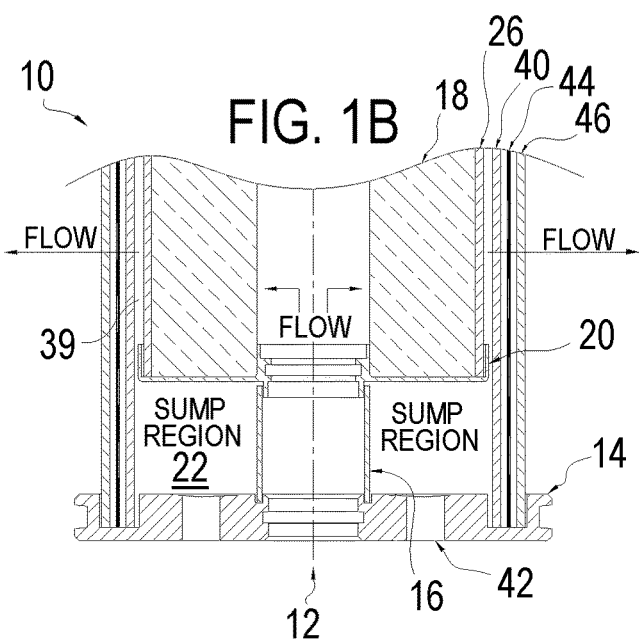

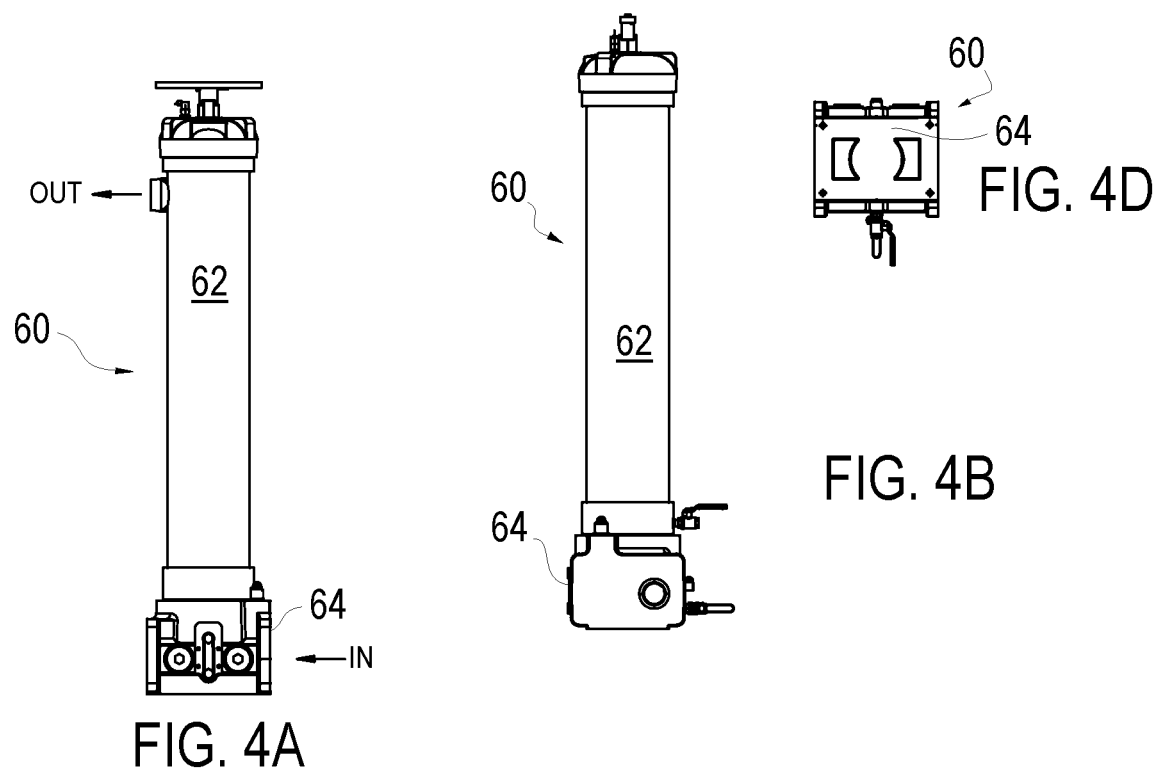

COALESCING FILTER ELEMENT AND FILTER ASSEMBLY THEREFORE

RELATED APPLICATIONS

This application is a continuation of U.S. patent application Ser. No. 14/206,549 filed Mar. 12, 2014 and which published Oct. 23, 2014 as Publication 2014-0311963 and which issued Aug. 1, 2017 as U.S. Pat. No. 9,718,011, which publication and patent are incorporated herein by reference in their entireties. U.S. patent application Ser. No. 14/206,549 claims priority to U.S. patent application Ser. No. 61/778,340 filed Mar. 12, 2013, entitled "Coalescing Filter Element and Filter Assembly Therefore" which application is incorporated herein by reference in its entirety.

BACKGROUND INFORMATION

1. Field of the Invention

The present invention relates to filter elements and filter assemblies, and more particular to coalescing filter element and coalescing filter assembly.

2. Background Information

Advances in diesel engine fuel injection systems have been instrumental in complying with current and future emission standards. Higher pressure fuel produces a finer mist of fuel, which burns cleaner. Common rail injection systems run at higher pressures and allow more injections per combustion cycle improving fuel economy, better engine performance and lower noise. Higher pressure fuel injector systems (e.g., 20,000+ psi) have tighter tolerances and require substantially free water removal to operate at the highest efficiency, and further generally require single-pass free water removal from fuel to minimize wear related failures.

Coalescing filtration can be a highly effective method to remove water from diesel fuels via coalescence, which is generally defined as a process by which two or more droplets, bubbles or particles merge during contact to form a single daughter droplet, bubble or particle. Coalescing filtration is used to separate emulsions into their components and can be classified as a mechanical coalescing unit, which typically use filters or baffles to make droplets coalesce. In contrast, electrostatic coalescing units use direct current (DC) or alternating current (AC) electric fields, or combinations thereof to separate emulsions into their components.

Water is typically introduced into the fuel supply by condensation. Water in a vehicle fuel system can reduce lubricity causing seizure of close tolerance parts and increased wear. Water in fuel storage tanks may cause rust and can promote microbial growth. Microbial growth in fuel storage systems begins in free water at the tank bottom and can quickly migrate through the fuel. In warm weather, microbial "blooms" can quickly overwhelm, and subsequently bypass, fuel filters causing contamination to reach the fuel injectors.

Mobile diesel machines and commercial vehicles are often subjected to the toughest working conditions. Optimum diesel fuel conditioning is particularly important to ensure smooth running of vehicles, and to protect both the engine and the whole drive system from damage. Effective diesel coalescing filtration offers protection from failures, breakdowns and expensive service interventions.

In fluid treatment applications, filtration units include i) disposable units in which the filtration media and housing are integrated into a single use unit, often called "spin-ons" due to a commonly found threaded attachment technique; ii) replaceable units in which the filtration media is formed in an element or cartridge that can be removed from a unit housing forming a filter assembly; and iii) filtration units with cleanable media, such as by back-flushing. Thus a filter element, also called a filter cartridge, within the meaning of this application, is a unit including filter media that is configured to be received in a filter assembly housing. The filter assembly is the filter housing and filter element together with other elements of the unit such as a control, test points, particle counters, bypass valves, etc.

There remains a need for a cost effective, efficient, coalescing filter element and coalescing filter assembly.

SUMMARY OF THE INVENTION

This invention is directed to a cost effective, efficient, coalescing filter element and coalescing filter assembly. The invention provides an integrated filter element with a three stage design with a hydrophobic or hydrophilic coalescing layer.

One aspect of the invention provides a coalescing filter element comprising: a) At least one particulate filtration layer; b) A coalescing layer promoting coalescing of water particles, wherein the coalescing layer is downstream of the at least one particulate filtration layer relative to the flow of fluid through the element; c) An annular coalescing space downstream of the coalescing layer; d) A sump in a lower portion of the filter element in fluid communication with the annular coalescing space; and e) A hydrophobic layer downstream of the annular coalescing space, wherein fluid being cleaned by the element flows through the hydrophobic layer.

One aspect of the invention provides a coalescing filter assembly comprising: At least one filter housing; An end cap for each filter housing; and a Coalescing filter element in at least one filter housing, the coalescing filter element including a) At least one particulate filtration layer; b) A coalescing layer promoting coalescing of water particles, wherein the coalescing layer is downstream of the at least one particulate filtration layer relative to the flow of fluid through the element; c) An annular coalescing space downstream of the coalescing layer; d) A sump in a lower portion of the filter element in fluid communication with the annular coalescing space; and e) A hydrophobic layer downstream of the annular coalescing space, wherein fluid being cleaned by the element flows through the hydrophobic layer.

These and other advantages of the present invention will be clarified in the description of the preferred embodiment taken together with the attached figures in which like reference numerals represent like elements throughout.

BRIEF DESCRIPTION OF THE DRAWINGS

FIG. 1A is a schematic section view of a hydrophobic coalescing filter element according to one embodiment of the present invention;

FIG. 1B is an enlarged view of the hydrophobic coalescing filter element of FIG. 1A;

FIG. 2A is a schematic section view of a hydrophilic coalescing filter element according to one embodiment of the present invention;

FIG. 2B is an enlarged view of the hydrophilic coalescing filter element of FIG. 2A;

FIGS. 4A-D are front, side, top and bottom views of an inline bulk fuel coalescing filter assembly using the coalescing filter elements of the present invention;

BRIEF DESCRIPTION OF THE PREFERRED EMBODIMENTS

Figure 3:
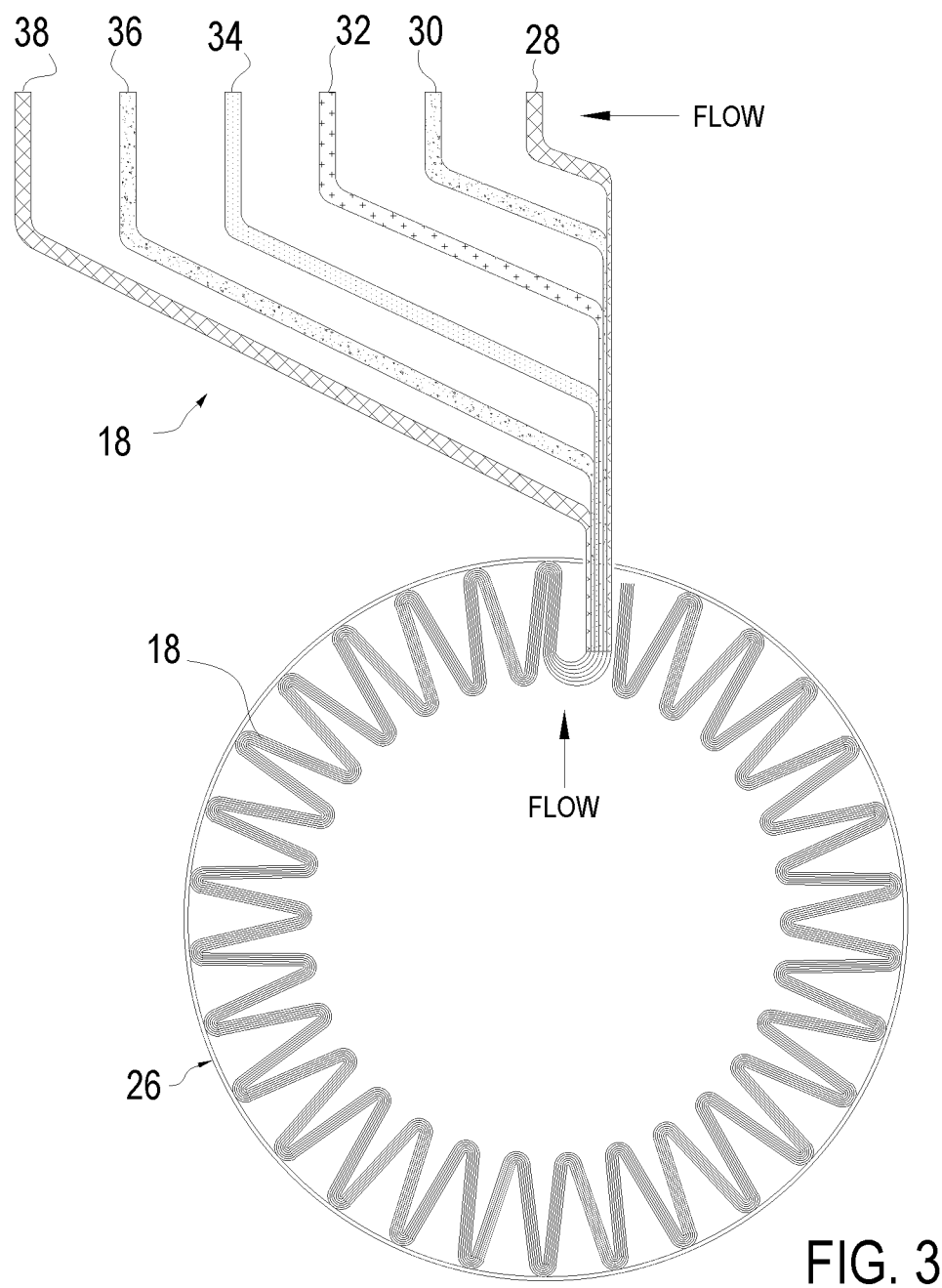
FIG. 3 is a schematic plan section view which is partially exploded of the hydrophobic media layer of the hydrophobic coalescing filter element of FIGS. 1A and 1B.

This invention is directed to a cost effective, efficient, coalescing filter element and coalescing filter assembly. The invention provides an integrated filter element with a three stage design with a hydrophobic or hydrophilic coalescing layer.

It is noted that, as used in this specification and the appended claims, the singular forms "a," "an," and "the" include plural referents unless expressly and unequivocally limited to one referent.

For the purposes of this specification, unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

FIGS. 1A and B are schematic section views of a hydrophobic coalescing filter element 10 according to one embodiment of the present invention which provides a three stage, single element design with a hydrophobic coalescing layer. The coalescing element features a particulate filtration layer, coalescing layer and separation layer within one element.

The element 10 is an inside-out flow design where fluid enters the element 10, via inlet 12 in the bottom end cap 14 and along centering tube 16, through the inner core and flows through each layer before it exits around the perimeter of the element 10. The primary application of this element 10 is for liquid-liquid separation of a dispersed phase, water, and a continuous phase, hydrocarbon oil or fuel oil.

Summary of Operation

For simplicity sakes, the continuous/dispersed phase mixture will be referred to as the mixture. The dispersed phase will be referred to as water and the continuous phase will be referred to as fuel. The mixture enters the coalescing element 10 through the inlet 12, in FIGS. 1A and B, in the lower end cap 14 and extends along centering tube 16 to enter the pleated pack 18. The centering tube 12 aligns the inner diameters of the bottom end cap 14 and the middle end cap 20 and defines the space of the sump 22.

The pleated pack 18 and outer support wrap 26 extends between upper end cap 24 and the intermediate end cap 20. The pleated pack 18 is shown in greater detail in FIG. 3. The pleated pack 18 is formed of an inner or upstream mesh support 28, an adjacent scrim layer 30, a pre-filter media layer 32 and a main filter media layer 34. Adjacent the filter media or main layer 34 is a layer of hydrophobic material 36 followed by a downstream supporting mesh 38. A circular support wrap 26 surround the pleat pack 18 and extend between the upper end cap 24 and the intermediate end cap 20.

The mixture first passes through pleated particulate filtration layers 32 and 34 of FIG. 3. These particulate filtration layers can be formed of conventional particulate filtration media and will retain contaminates that would otherwise collect on the coalescing layer 36 and prematurely degrade its performance. Both the particulate filtration layers 32 and 34 and the coalescing layer 36 are located within one pleated media pack 18.

Next, following the particulate filter layers 32 and 34, the mixture encounters the coalescing layer 36. The coalescing layer 36 in this embodiment is a hydrophobic material which repels smaller water droplets causing them to build on the surface rather than pass through. As these water droplets build up on the surface of the hydrophobic material 36 they will contact each other and combine together. These water droplets will eventually become big enough to be pushed through by the fluid velocity.

Once through, the coalesced water drops will enter the gravity separation space 39 adjacent support tube 40 which can also be described as forming an annular coalescing flow channel 39. The layer 40 extends from end cap 24 to lower end cap 14 as shown in FIGS. 1A and B. Since the larger water droplets have a higher specific gravity than the fuel, gravity will cause the larger coalesced droplets to fall downward in channel 39 to the sump region 22 of the element 10 between the lower end cap 14 and the intermediate end cap 20.

Coalesced water in the sump region 22 will then be allowed to flow out the element 10 through drain holes 42 in lower end cap 11.

Finally, any water droplets located in the gravity separation region 39 defined by layer or support tube 40 will be impeded from exiting the element 10 through the perimeter by a hydrophobic separation layer 44. The separation layer 44 is made of a hydrophobic material. Exiting through the perimeter of the element 10 through outer support wrap or layer 46 will be clean fuel with un-dissolved water removed. The separation layer 44 is formed between an outer mesh support layer 46, also called an outer wrap or outer tube, and an inner support tube or layer 40 which all extend between the lower end cap 14 and the upper end cap 24. The support tubes or layers 40 and 46 are perforated support tubes providing support to the element 10 and protection of the separation layer 44. The separation support layer assembly thus includes a perforated support tube 40 that prevents the separation layer 44 from contacting the coalescing region 39 between layer 40 and the layer 26 which could decrease the gravity separation region effective area or allow for "wicking" of water droplets through the separation layer 46 and out the perimeter of the element 10. Particulate Filtration/

Coalescing Layer Support Wrap 26 includes a perforated wrap and provides support to the particulate filtration/coalescing layer 18.

FIGS. 2A and B are schematic section views of a hydrophilic coalescing filter element 50 according to one embodiment of the present invention which provides a three stage, single element design with a hydrophilic coalescing layer. The coalescing element 50 features a particulate filtration layer, coalescing layer and separation layer within one element 50.

The element 50 is also an inside-out flow design where fluid enters the element 50 through the inner core and flows through each layer before it exits around the perimeter of the element. The primary application of this element 50 is also for liquid-liquid separation of a dispersed phase, water, and a continuous phase, hydrocarbon oil or fuel oil. The element 50 is analogous to element 10 discussed above and common components are identified with common reference numerals and are described in detail above.

Summary of Operation

For simplicity sakes, the continuous/dispersed phase mixture will again be referred to as the mixture. The dispersed phase will be referred to as water and the continuous phase will be referred to as fuel.

The mixture enters the coalescing element 50 through the inlet 12 of lower end cap 14 and through centering tube 16. The mixture first passes through pleated particulate filtration layer 52 and associated support tube 54. This particulate filtration layer 52 retain contaminates that would otherwise collect on the coalescing layer 56 and degrade its performance. The filtration layer operates analogously to layers 32 and 34 of pack 18 of element 10 above.

Next the mixture encounters the coalescing layer 56. The coalescing layer 56 is a hydrophilic material which attracts smaller water droplets causing them to be absorbed. As these water droplets build up within the hydrophilic material of layer 56 they will contact each other and combine together. These water droplets will eventually become big enough to be pushed through by the fluid velocity.

Once through, the coalesced water drops will enter the gravity separation area 39 between layer 56 and layer 40. Since the larger water droplets have a higher specific gravity than the fuel, gravity will cause the coalesced droplets to fall downward in channel 39 to the sump region 22 of the element 50.

Coalesced water in the sump region 22 will then be allowed to flow out the element 50 through drain holes 42. Finally, any water droplets located in the gravity separation region 39 between layer 56 and layer 40 will be impeded from exiting the element 50 through the perimeter by a separation layer 44. The separation layer 44 as noted above is made of a hydrophobic material. Exiting through the perimeter of the element 50 will be clean fuel with un-dissolved water removed.

The main difference between the embodiments of FIGS. 1a and b and 2a and b is the use of hydrophilic material 56 rather than hydrophobic material 36 in pack 18 and the associated change in the method of operation. Additionally a support tube 26 formed as a perforated tube provides support to the particulate filtration/coalescing layer pack 18 in the embodiment of FIGS. 1A and B and particulate filter layer 52 is separate from the hydrophilic material 56 in the embodiment of FIGS. 2A and B. The embodiment of FIG. 1 could include the separate particulate filter configuration of FIG. 2 while the construction of FIG. 2 could be combined into a pack construction analogous to FIG. 1.

FIGS. 4A-D are front, side, top and bottom views of an inline bulk fuel coalescing filter assembly 60 using one of the coalescing filter elements 10 and/or 50 of the present invention. The coalescing filter assembly 60 includes a filter housing 62 and end cap. The end cap 64 may be easily formed as a K9™ brand end cap available from the assignee of the present application. The assembly 60 utilizes the three-phase element construction for high efficiency, single-pass removal of un-dissolved water in diesel fuels. The assembly 60 can be can be upstream (suction side) or downstream (pressure side) of transfer pumps to protect expensive, vital engine components against failures caused by water contaminated fuel. The coalescing filter assembly 60 can separate emulsified or finely dispersed water from fuel and allows for use in single-pass fuel dispensing or multi-pass reservoir clean-up and continuous maintenance. In operation the assembly 60 has greater than 99.5% efficiency at removing un-dissolved water in a single pass.

The details can be summarized in the following specification listing for the assembly 60: Flow rating of Up to 70 gpm (265 L/min) for ULSD15; Max. Operating Pressure: 100 psi (7 bar); 45 psi (3 bar) with water sight gauge; Min. Yield Pressure: 400 PSI (27.6 bar) without sight gauge; Temperature range: −20° F. to 165° F. (−29° C. to 74° C.); and Weight: 155 Lbs. (77 kg).

Figure 5A:
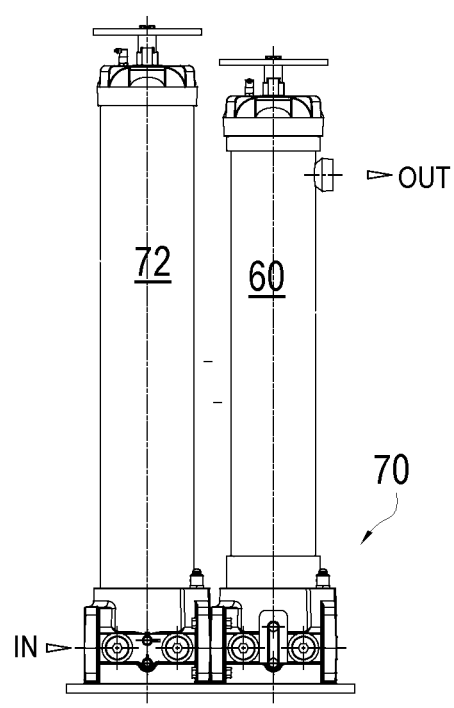
FIGS. 5A-B are side and top views of a diesel skid filter assembly with a coupled pre-filter assembly and using the coalescing filter elements of the present invention.
Figure 5B:
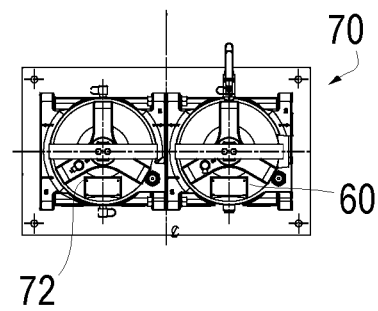

FIGS. 5A-B are side and top views of a diesel skid filter assembly 70 with a coupled pre-filter assembly 72 and an assembly 60 using the coalescing filter elements 10 or 50 of the present invention. The assembly 70 of FIGS. 5A and B couples two assemblies 72 and 60 in series with the first assembly 72 using a particulate filter element (not shown, but available from the assignee). The K9™ modular end caps 64 allow for easy coupling of the two assemblies 72 and 60 in series. The second downstream assembly 60 uses the three stage coalescing filter element 50 or 10 of the invention.

Figure 6:
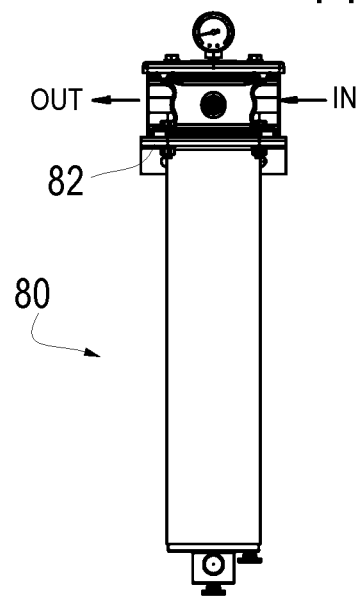
FIG. 6 is a side view of an inline bulk fuel coalescing filter assembly using the coalescing filter elements of the present invention.

FIG. 6 is a side view of an inline bulk fuel coalescing filter assembly 80 using the coalescing filter elements 50 or 10 of the present invention in a slightly different embodiment. Namely the inlet to the assembly 80 is through the upper end cap 82 for this assembly and is illustrated to show the modifications of the present invention. The operating parameters of this assembly 80, for comparison, are as follows: Flow rating of Up to 16 gpm (60 L/min) for ULSD15; Max. Operating Pressure: 100 psi (7 bar); Min. Yield Pressure: 400 PSI (27.6 bar); Temperature range: −20° F. to 165° F. (−29° C. to 74° C.); and Weight: 19 lbs (8.6 kg).

The preferred embodiments described above are illustrative of the present invention and not restrictive hereof. It will be obvious that various changes may be made to the present invention without departing from the spirit and scope of the invention. The precise scope of the present invention is defined by the appended claims and equivalents thereto.

What is claimed is:

1. A coalescing filter element comprising
   a) At least one pleated particulate filtration layer;
   b) A pleated coalescing layer promoting coalescing of water particles, wherein the pleated coalescing layer is downstream of the at least one pleated particulate filtration layer relative to the flow of fluid through the element;
   c) An annular coalescing space downstream of the pleated coalescing layer;

d) A sump in a lower portion of the filter element above a lower endcap of the filter element and in fluid communication with the annular coalescing space;

e) A hydrophobic layer downstream of the annular coalescing space, wherein fluid being cleaned by the element flows through the hydrophobic layer;

where the filter element is an inside out flow design, where the filter element includes the lower end cap and an intermediate end cap on opposite sides of the sump, a centering tube extending from an inlet of the lower end cap to the intermediate end cap; where the treated fluid enters the coalescing filter element via the inlet in the lower end cap and along the centering tube, to an inner core for the pleated particulate filtration layer; where the filter element includes an upper end cap and where each of the pleated particulate filtration layers and the pleated coalescing layer extend between the upper end cap and the intermediate end cap, and wherein the hydrophobic layer downstream of the annular coalescing space extends between the upper end cap and the lower end cap.

2. The coalescing filter element according to claim 1 further including a spacing support tube between the annular coalescing space and the hydrophobic layer which is downstream of the annular coalescing space.

3. The coalescing filter element according to claim 2 wherein the pleated coalescing layer promoting coalescing of water particles is formed as a hydrophobic material.

4. The coalescing filter element according to claim 2 wherein the pleated coalescing layer promoting coalescing of water particles is formed as a hydrophilic material.

5. A coalescing filter assembly comprising:

At least one filter housing;

and a Coalescing filter element in at least one filter housing, the coalescing filter element including a) At least one pleated particulate filtration layer;

b) A pleated coalescing layer promoting coalescing of water particles, wherein the pleated coalescing layer is downstream of the at least one pleated particulate filtration layer relative to the flow of fluid through the element;

c) An annular coalescing space downstream of the coalescing layer;

d) A sump in a lower portion of the filter element above a lower endcap of the filter element and in fluid communication with the annular coalescing space;

e) A hydrophobic layer downstream of the annular coalescing space, wherein fluid being cleaned by the element flows through the hydrophobic layer;

f) the lower end cap and an intermediate end cap on opposite sides of the sump;

g) a centering tube extending from an inlet of the lower end cap to the intermediate end cap; and where the treated fluid is enters the coalescing filter element via the inlet in the lower end cap and along the centering tube, to an inner core for the pleated particulate filtration layer.

6. The coalescing filter assembly according to claim 5 wherein the coalescing filter element is an inside out flow design.

7. The coalescing filter assembly according to claim 6 wherein the coalescing filter element includes the lower end cap and an intermediate end cap on opposite sides of the sump.

8. The coalescing filter assembly according to claim 7 wherein the coalescing filter element includes an upper end cap and wherein each of the pleated particulate filtration layers and the pleated coalescing layer extend between the upper end cap and the intermediate end cap.

9. The coalescing filter assembly according to claim 8 wherein in the coalescing filter element the hydrophobic layer downstream of the annular coalescing space extends between the upper end cap and the lower end cap.

10. The coalescing filter assembly according to claim 9 wherein in the coalescing filter element a spacing support tube is between the annular coalescing space and the hydrophobic layer which is downstream of the annular coalescing space.

11. The coalescing filter assembly according to claim 10 wherein in the coalescing filter element the pleated coalescing layer promoting coalescing of water particles is formed as a hydrophobic material.

12. The coalescing filter assembly according to claim 11 wherein in the coalescing filter element the pleated coalescing layer is formed in annular corrugated pack with the at least one pleated particulate filter layer.

13. The coalescing filter assembly according to claim 10 wherein in the coalescing filter element the pleated coalescing layer promoting coalescing of water particles is formed as a hydrophilic material.

14. The coalescing filter assembly according to claim 10, wherein an upstream filter housing and a downstream filter housing are provided coupled in series with a particulate filter element located in the upstream housing and the coalescing filter element in the downstream filter housing.

* * * * *